United States Patent [19]

Barrett

[11] Patent Number: 5,260,805
[45] Date of Patent: Nov. 9, 1993

[54] PROCESS FOR IDENTIFYING PROGRAMMING CONFLICTS IN ELECTRONIC PRINTING SYSTEMS

[75] Inventor: Michael W. Barrett, Rochester, N.Y.

[73] Assignee: Xerox Corporation, Stamford, Conn.

[21] Appl. No.: 748,713

[22] Filed: Aug. 22, 1991

[51] Int. Cl.⁵ .................................................. H04N 1/40
[52] U.S. Cl. ..................................... 358/449; 358/451
[58] Field of Search .................. 358/449, 451; 382/46, 382/47, 45; 395/102, 113

[56] References Cited

U.S. PATENT DOCUMENTS

| | | | |
|---|---|---|---|
| 4,398,222 | 8/1983 | Ogawa | 358/287 |
| 4,686,577 | 8/1987 | Arimoto | 358/256 |
| 4,731,658 | 3/1988 | Koseki | 358/287 |
| 4,769,852 | 9/1988 | Hashimoto et al. | 382/45 |
| 4,771,473 | 9/1988 | Sugiura | 382/47 |
| 4,789,900 | 12/1988 | Takahashi | 358/257 |
| 4,814,893 | 3/1989 | Katoh | 358/296 |
| 4,814,894 | 3/1989 | Yoshida | 358/449 |
| 4,908,672 | 3/1990 | Ito | 355/311 |
| 5,053,885 | 10/1991 | Telle | 358/449 |
| 5,093,653 | 3/1992 | Ikehira | 382/46 |
| 5,105,285 | 4/1992 | Miyata | 358/449 |
| 5,146,343 | 9/1992 | Fujii | 358/449 |
| 5,148,295 | 9/1992 | Matsubara | 358/449 |
| 5,162,918 | 11/1992 | Muramatsu | 358/451 |

*Primary Examiner*—Edward L. Coles, Sr.
*Assistant Examiner*—Thomas L. Stoll
*Attorney, Agent, or Firm*—Frederick E. McMullen

[57] ABSTRACT

An electronic printing system with a touchscreen for programming print jobs using job tickets displayed on the screen, the job tickets having various job programming choices together with scaled representations of the print image superimposed on the print media selected, and a control for comparing the size of the print image as originally oriented with the maximum image size and displaying a fault message on the screen in the event that the print image size exceeds the system maximum image size even though the print image as displayed fits into the print media.

6 Claims, 17 Drawing Sheets

FIG. 7

PROCESS FOR IDENTIFYING PROGRAMMING CONFLICTS IN ELECTRONIC PRINTING SYSTEMS

The invention relates to electronic printing systems, and more particularly, to a system for informing the operator of electronic printing systems of programming conflicts.

Electronic printing systems utilize a printer such as a laser printer to make prints from video image signals derived, for example, from scanning image bearing documents and converting the scanned images to image signals. A programmer enables the system operator or user to input programming instructions for the printing jobs to be run. In recent systems of this type, this includes a CRT type display screen such as a touchscreen for displaying programming choices, system operating conditions, etc.

In more complex printing systems, the number of potential programming selections is very large, raising the possibility of programming conflicts in which one or more programming selections either conflict with a previous programming selection or exceed the ability of the system to perform the program. In the case of the latter, there is, as will be understood, an upper or maximum limit to the size of the print image that the system can process. Thus, where job programming selections include items such as image reduction and enlargement, image rotation, etc., programming of a succession of such selections may result in a print image that exceeds the maximum size that the system is capable of processing.

In the prior art, it is known to reduce the size of an image in order that the image fit onto a print media as witness U.S. Pat. No. 4,814,894 to Yoshida which discloses an image communicating system that reduces the size of an oversized document image at the transmitting side to produce a modified image that will properly fit onto a recording paper of selected size at the receiving side prior to printing. Also, U.S. Pat. No. 4,731,658 to Koseki discloses a facsimile machine that reduces the dimensions of a document image within a transmitting unit so that the image properly fits onto a recording paper of selected size, while U.S. Pat. No. 4,789,900 to Takahashi discloses a digital image communication system which reduces the size of document image stored within a transmitting unit when a recording sheet of smaller size is detected at the receiving unit. And, U.S. Pat. No. 4,769,852 to Hashimoto discloses an image processing system that modifies the size of an original to fit within and into the center of a recording paper of selected size. Further, U.S. Pat. No. 4,686,577 to Arimoto discloses an original reading apparatus which detects the size of an original resting on a scanning platform, converts the original into an electronic image, reduces or enlarges the image, and prints the image centered onto a copy sheet, while U.S. Pat. No. 4,771,473 to Sugiura discloses an image reader that transforms a document to a digital image, electronically reduces or enlarges the digital image to a desired size, and then prints the resulting image onto a recording medium. Additional U.S. Pat. Nos. 4,814,893 to Katoh and 4,398,222 to Ogawa disclose image processing systems that select the size of the recording sheet for printing based on the size of the stored document image.

In contrast, the present invention provides a process for identifying programming conflicts when programming a print job on an image processing system having a document scanner for scanning image bearing documents and converting the document images to image signals, processing means for processing the image signals in accordance with programming instructions to provide print images for making prints, a printer for making prints on print sheets from the print images, and a display screen for displaying job programming selections and instructions, comprising the steps of: identifying the orientation of the documents to be scanned for the job; programming the print media size on which prints of the print images are to be made by the printer; displaying a scale representative showing the size of the print media programmed on the screen; displaying a scale representative of the print image being programmed superimposed on the print media representation; programming instructions for changing the orientation of the print image on the print media; re-displaying the print image on the print media to show the change in print image orientation; comparing the size of the print image in the same orientation as the document orientation with the maximum size print image that can be processed by the system; and where the comparison indicates that the size of the print image in the same orientation as the document orientation is greater than the maximum size that can be processed by the system, displaying a conflict message on the screen even though the print image is displayed as fitting within the print media.

IN THE DRAWINGS

Figure 1:
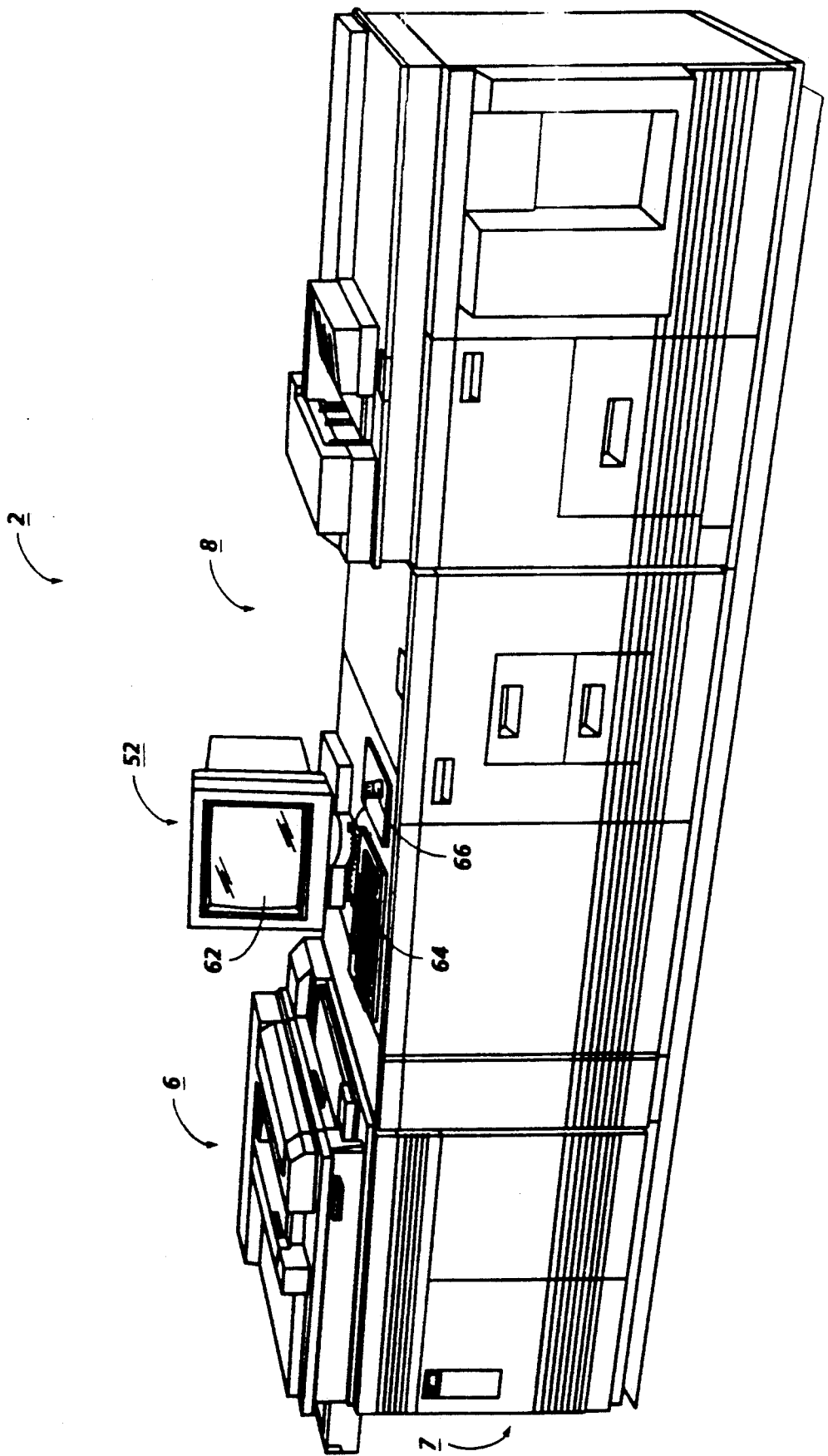
FIG. 1 is a view depicting an electronic printing system incorporating the present invention.
Figure 5A:
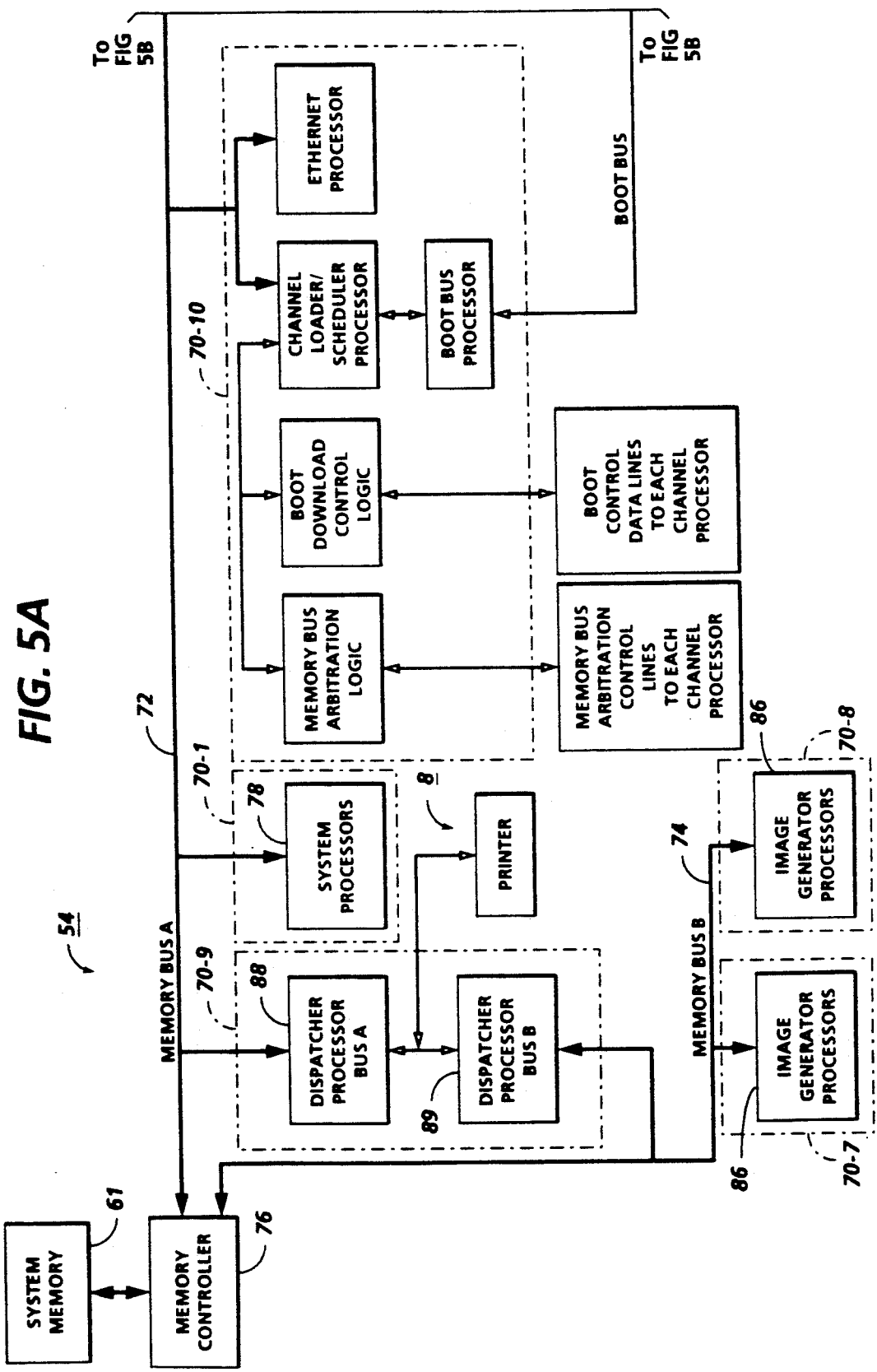
Figure 5B:
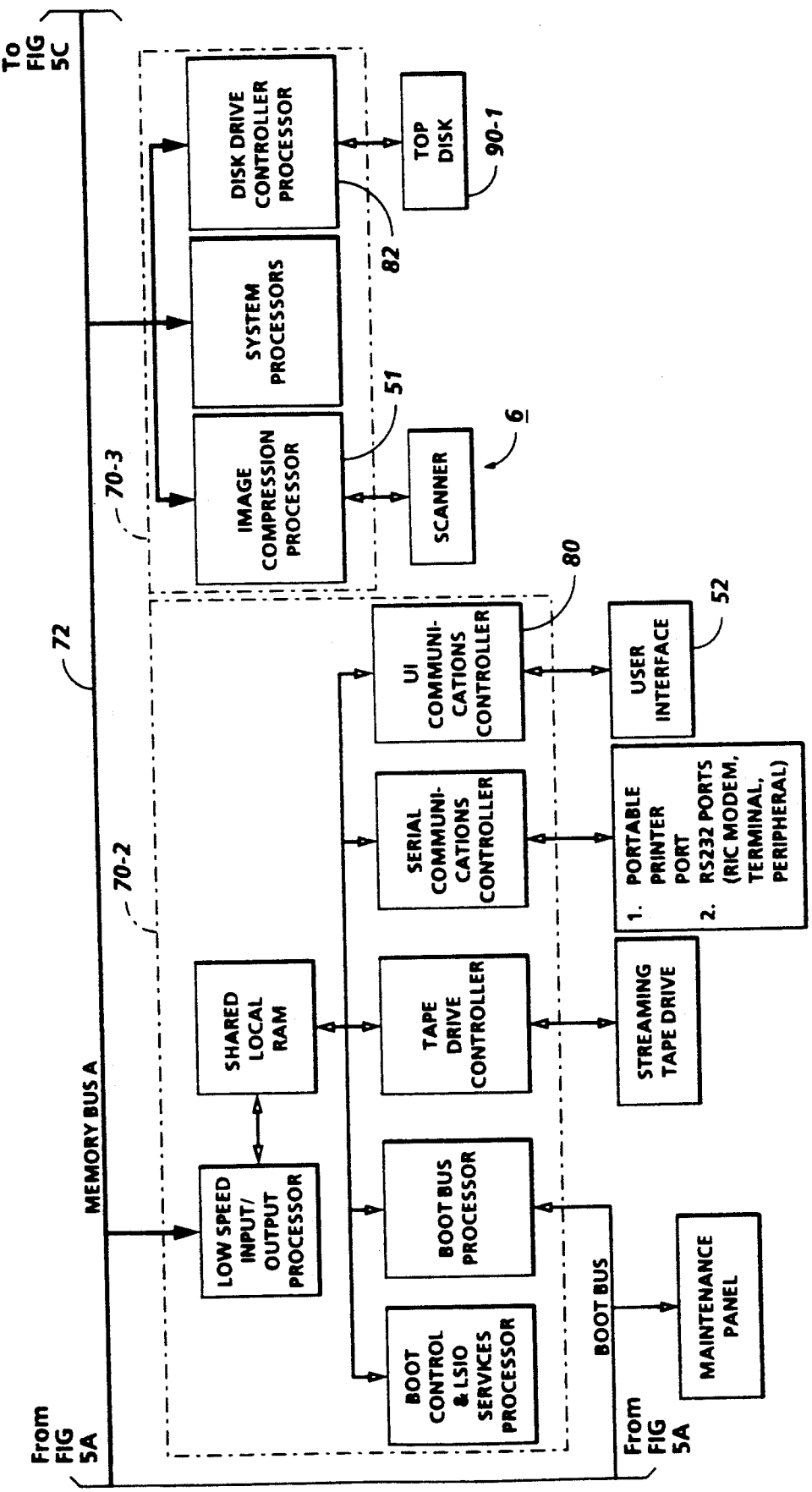
Figure 5C:
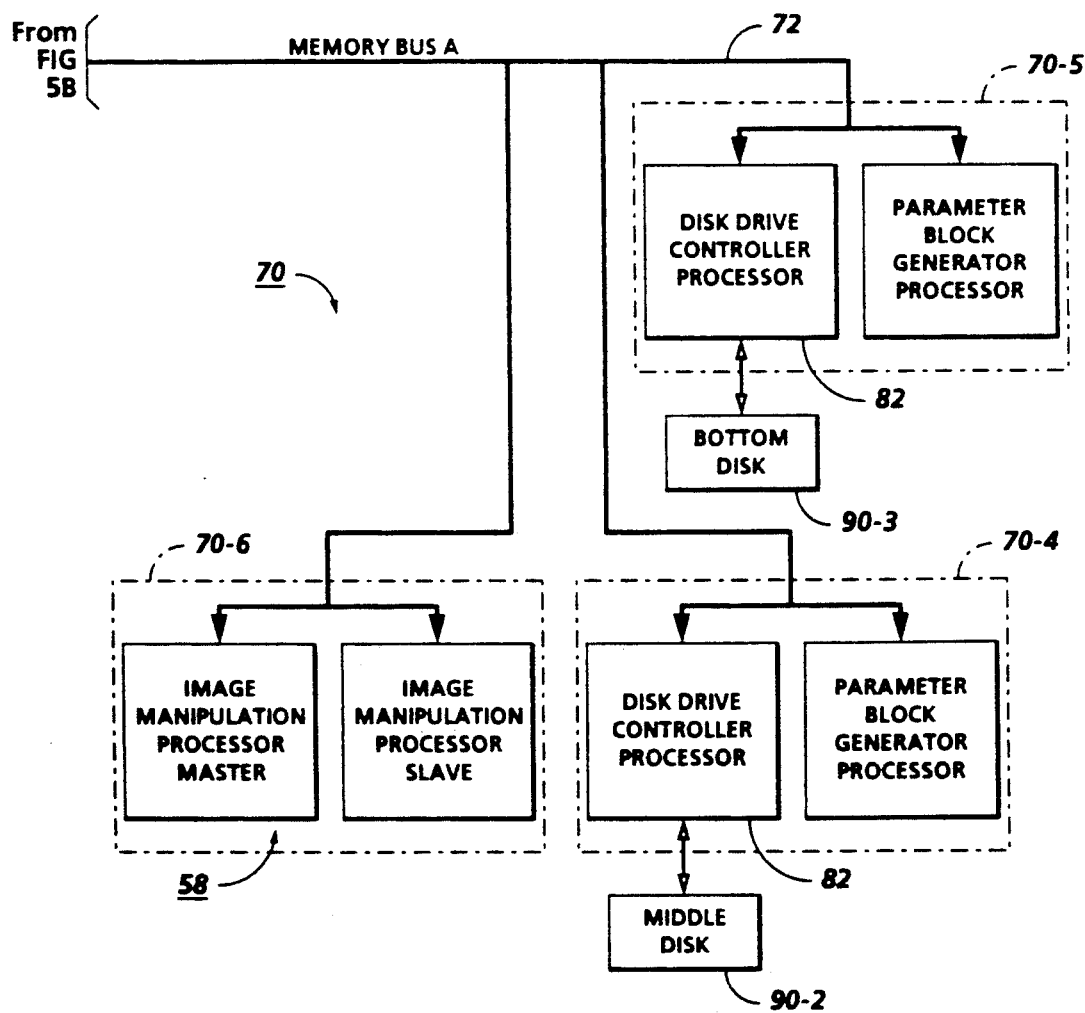
Figure 6:
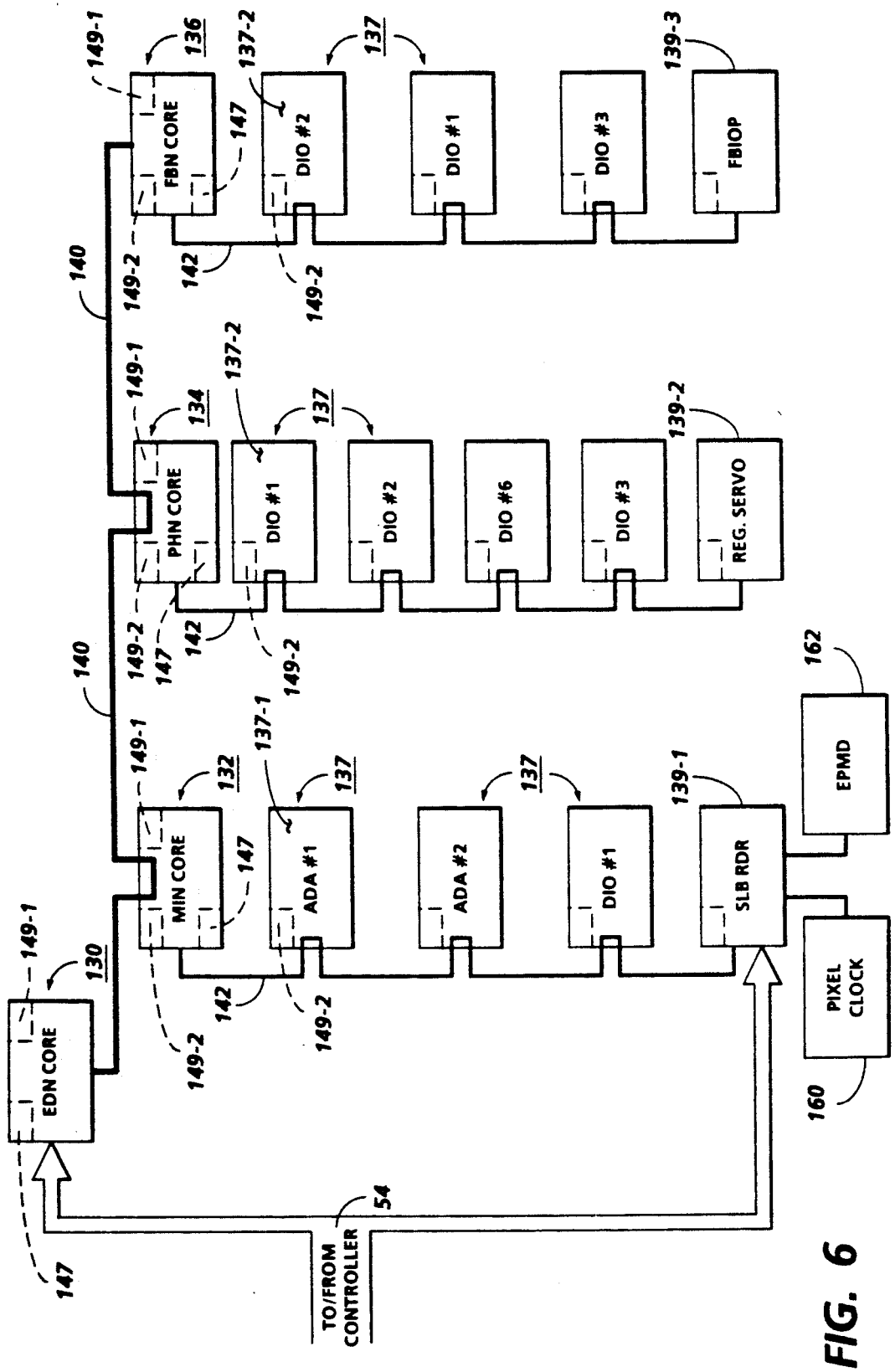
Figure 8:
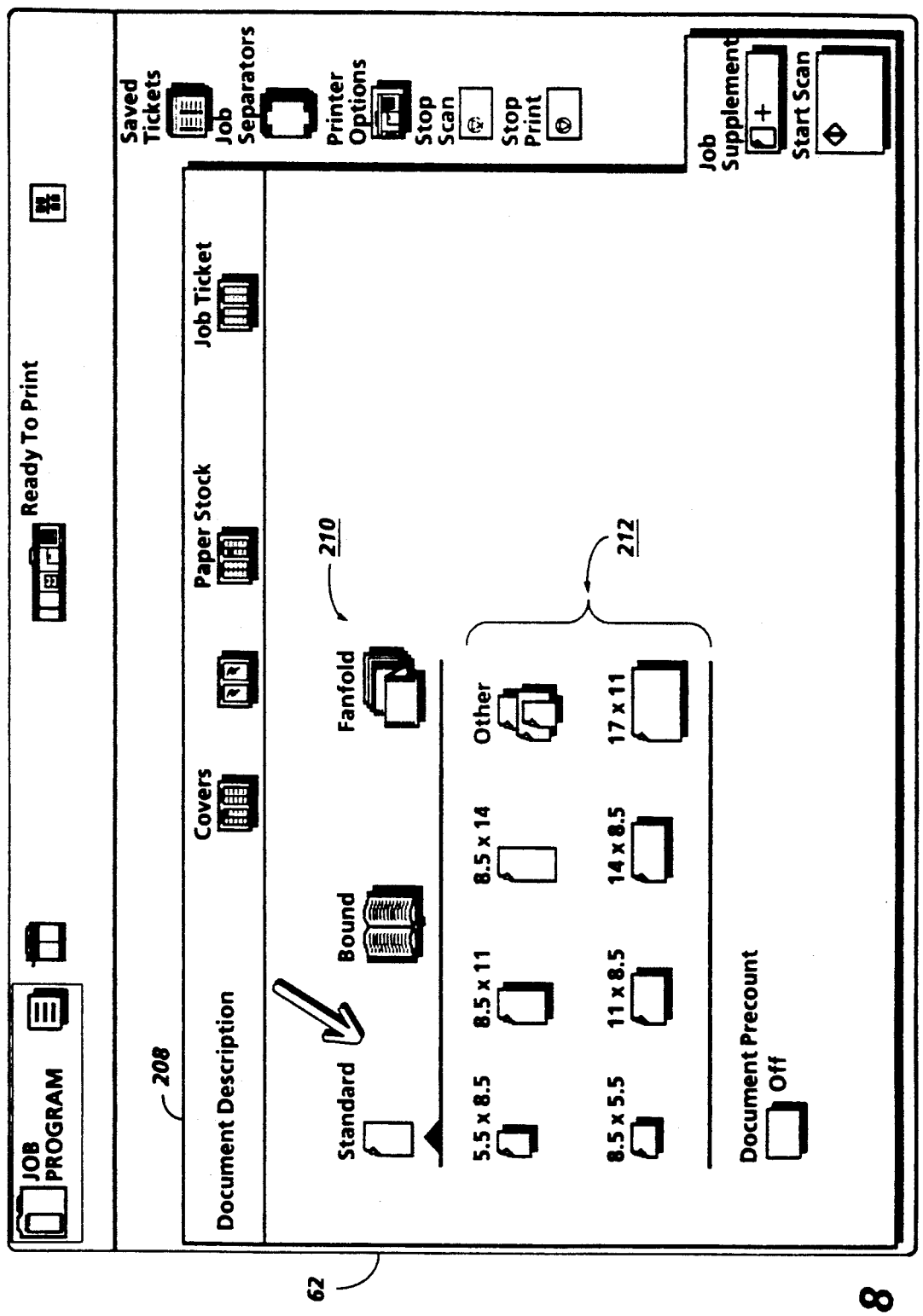
Figure 9:
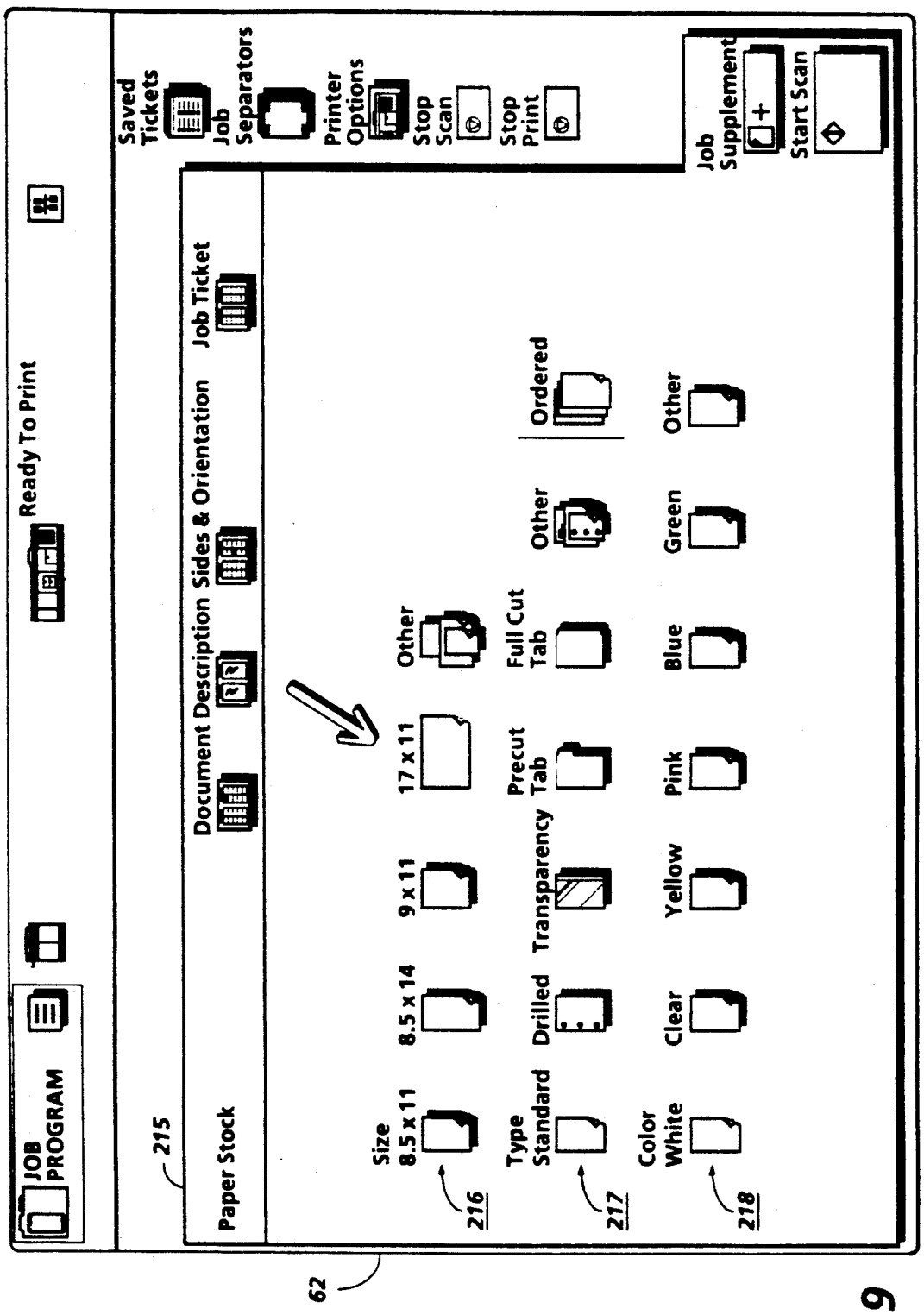
Figure 10:
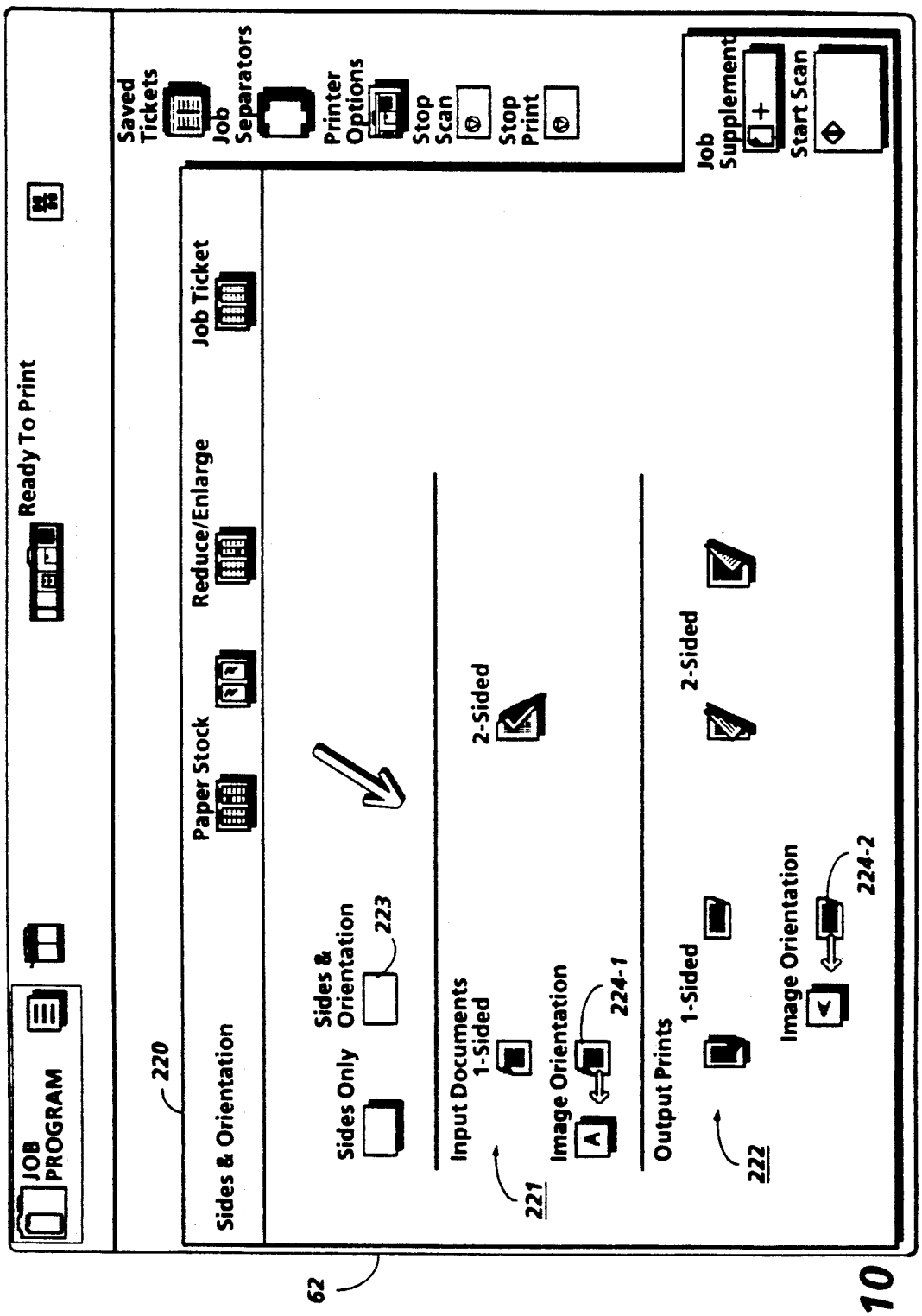
Figure 11:
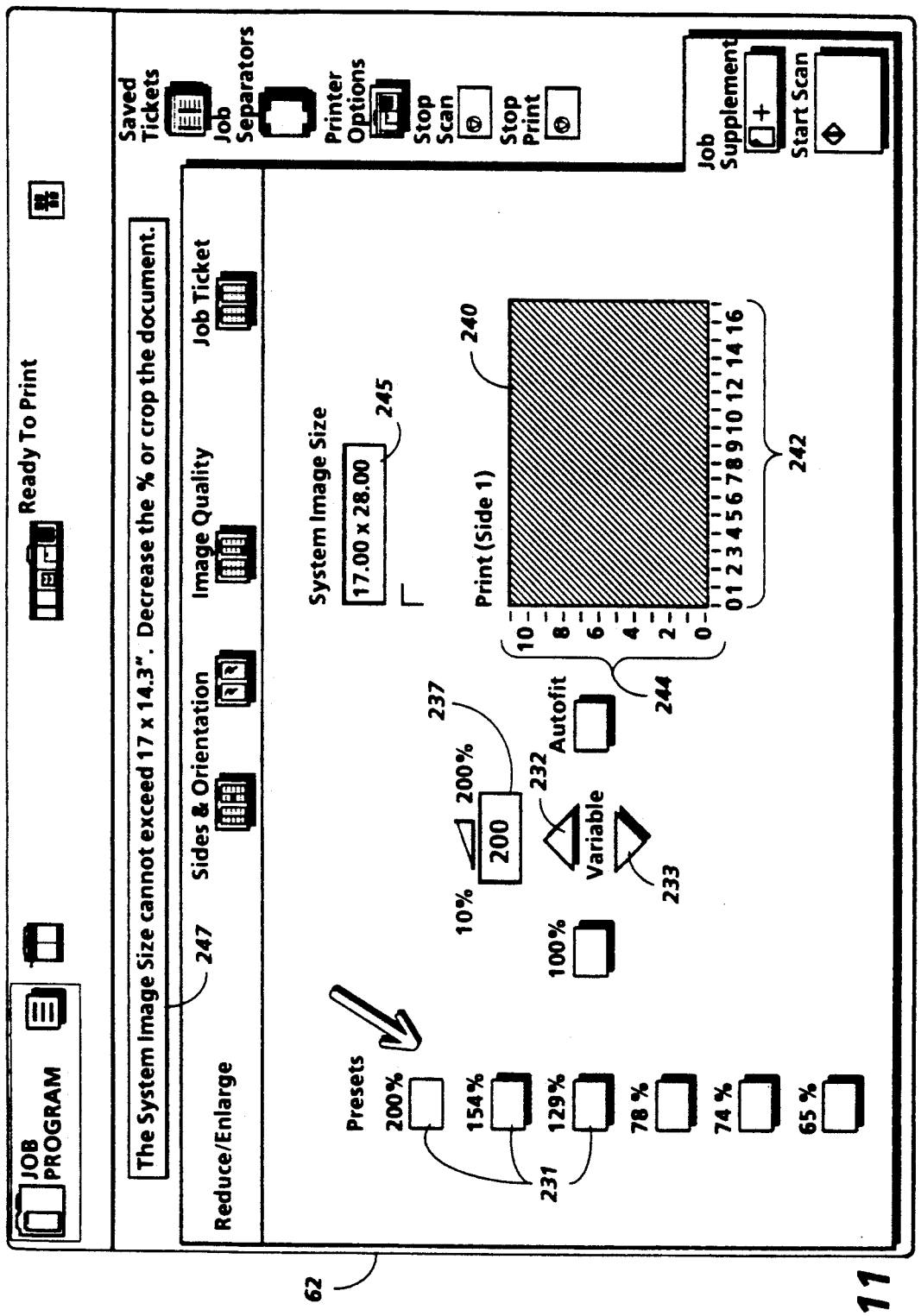
Figure 12:
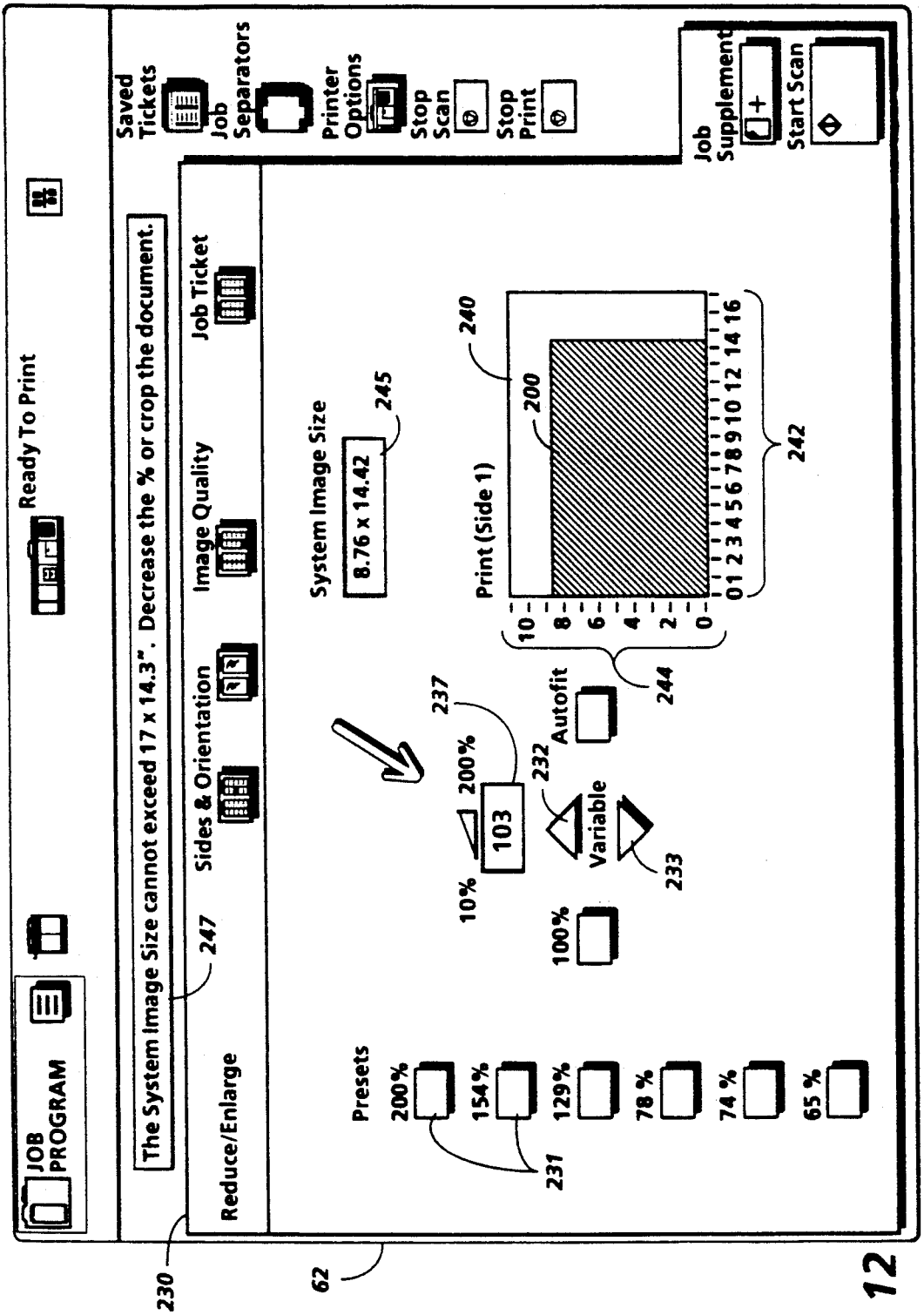
Figure 13:
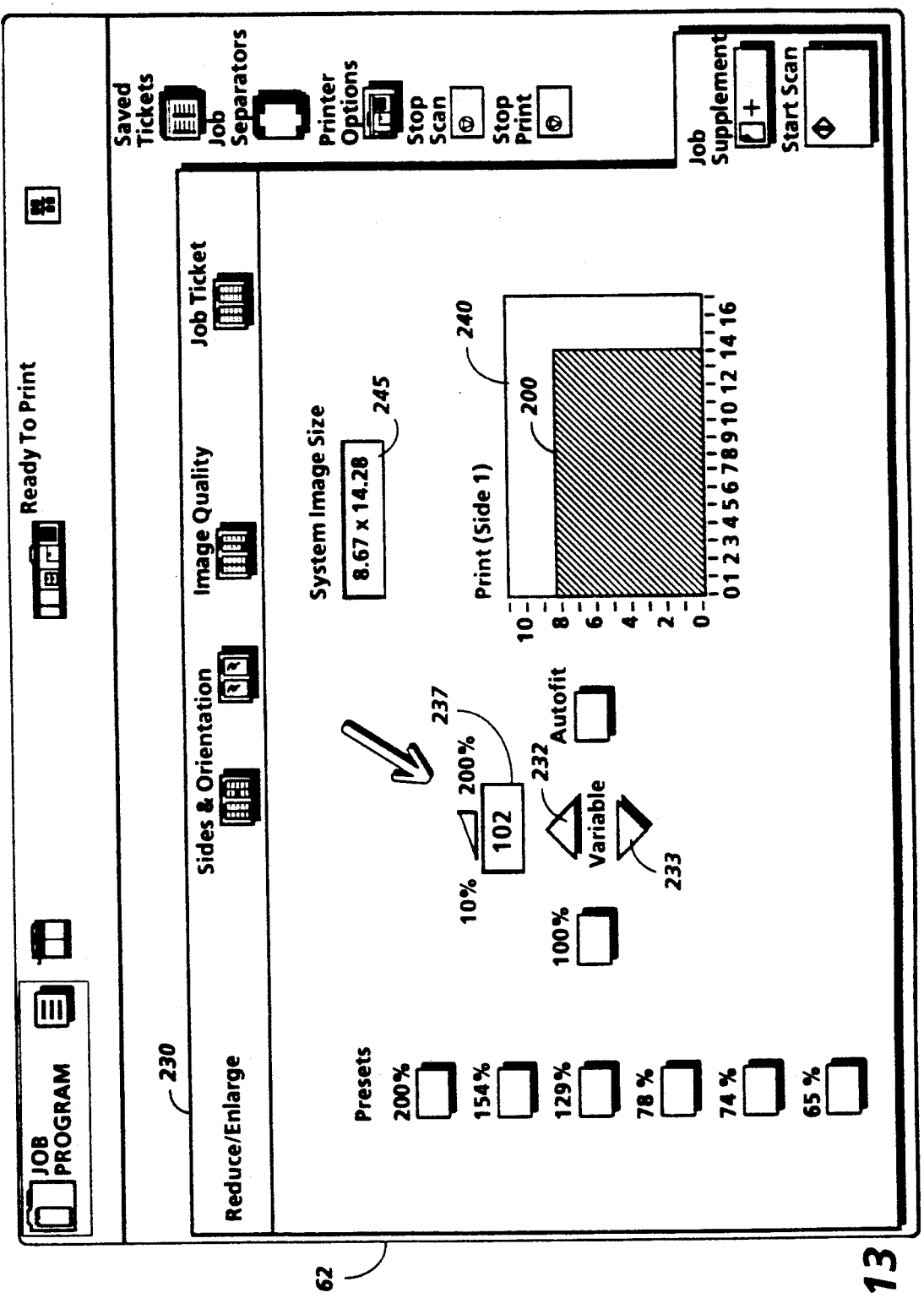
Figure 14:
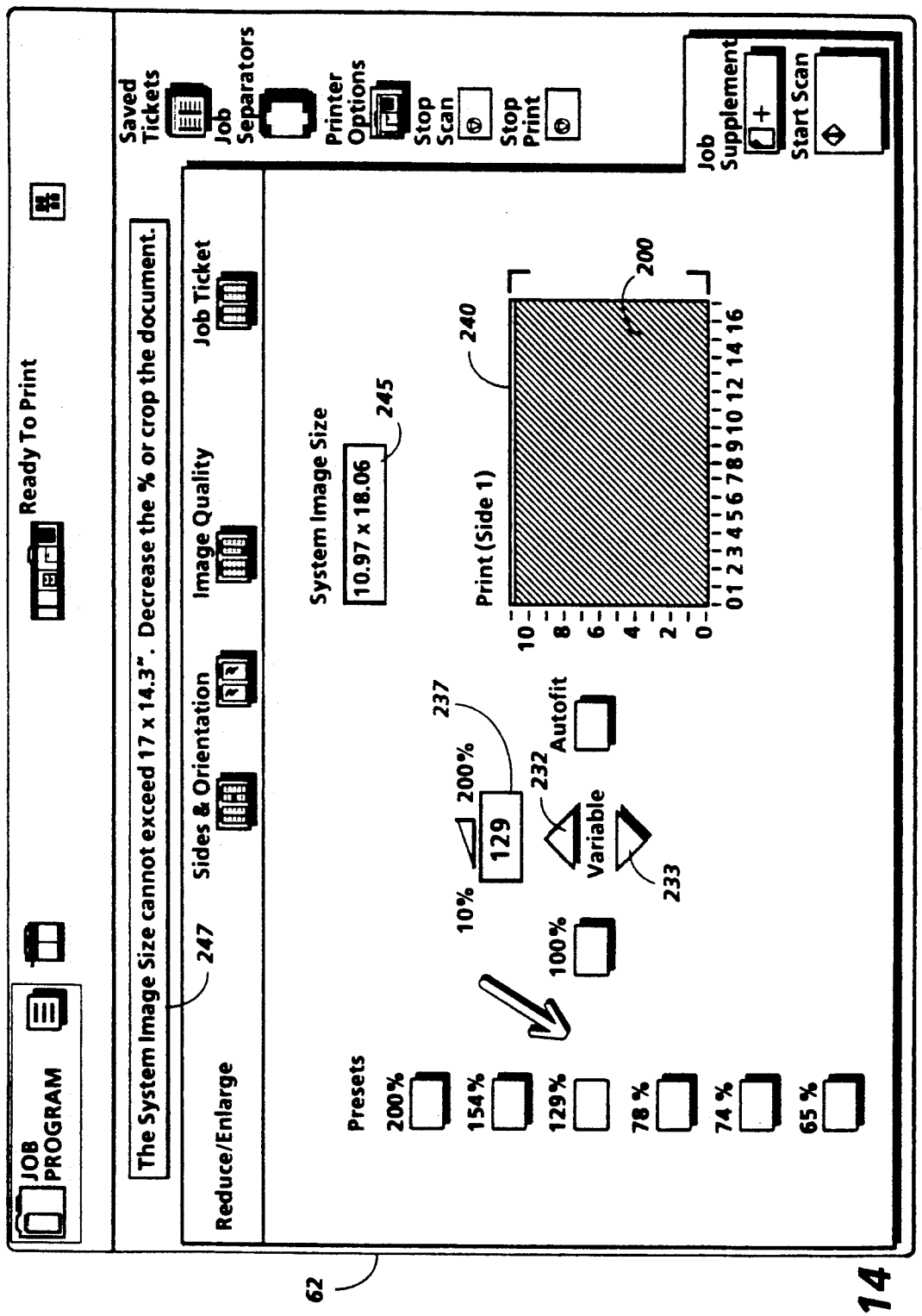
Figure 15:
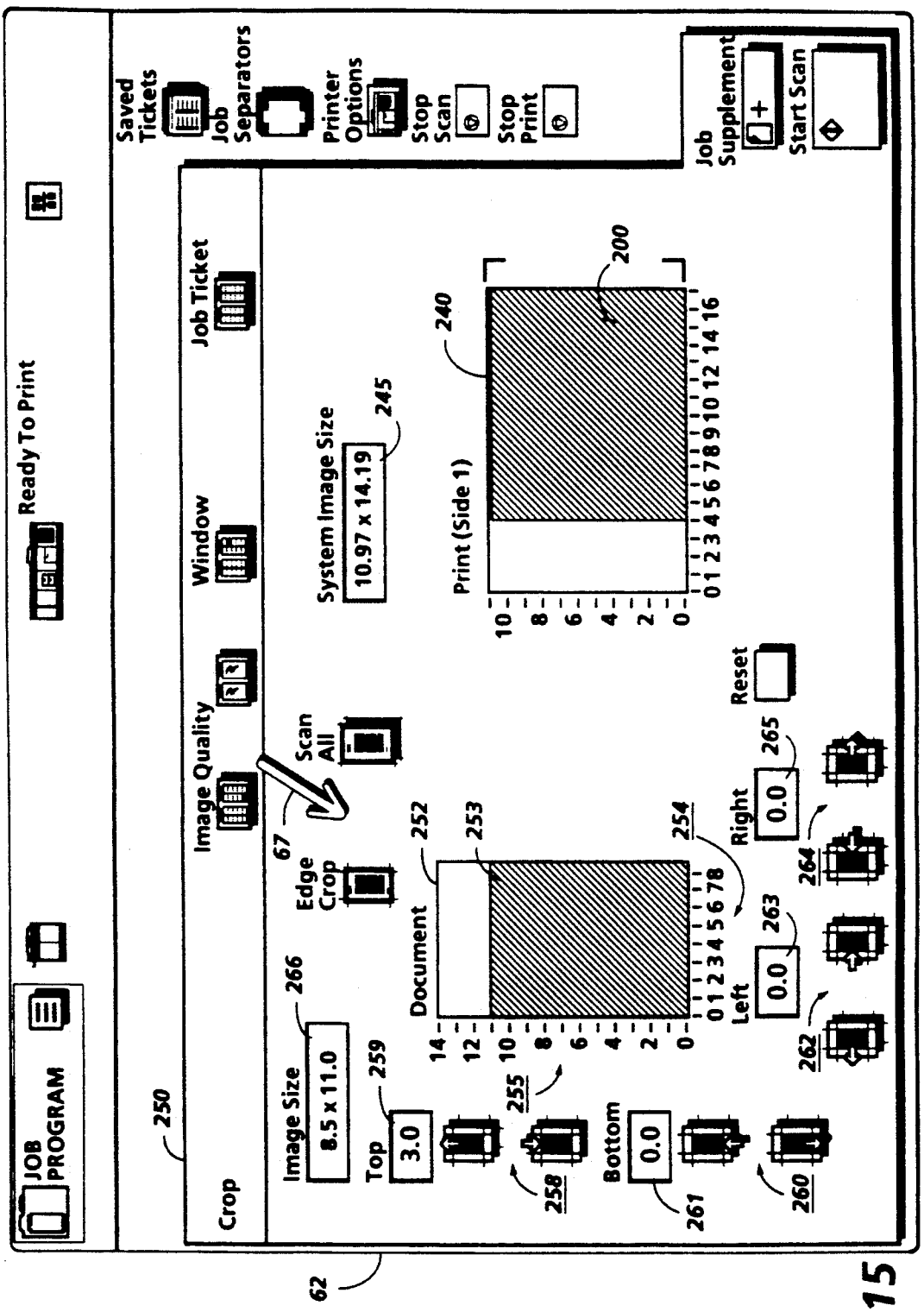

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

Figure 7:
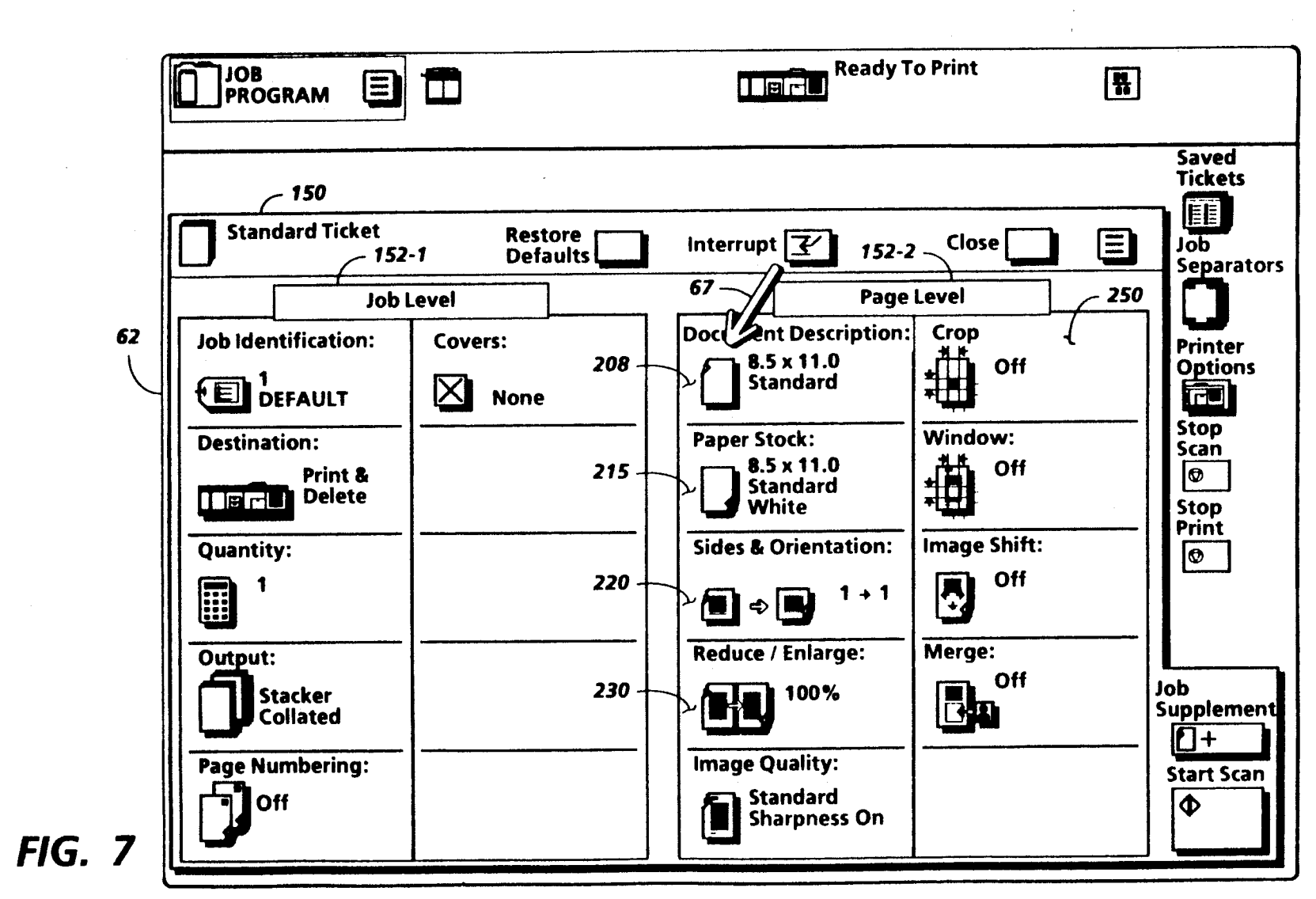

FIG. 7 is a view of a job ticket with job scorecards as displayed on the User Interface (UI) touchscreen for use by the operator in programming a print job;

FIG. 8 is a view following opening of the Document Description window of the Job Ticket shown in FIG. 7 showing document description programming selections;

FIG. 9 is a view following opening of the Paper Stock window of the Job Ticket shown in FIG. 7 showing Paper Stock programming selections;

FIG. 10 is a view following opening of the Sides & Orientation window of the Job Ticket shown in FIG. 7 showing document and print sides and orientation selections;

FIG. 11 is a view following opening of the Reduce & Enlarge window of the Job Ticket shown in FIG. 7 showing preset and variable print image reduction/enlargement selections;

FIG. 12 is a view of the Reduce/Enlarge window shown in FIG. 11 depicting a conflict message in response to programming a print image size exceeding the maximum image size that can be processed;

FIG. 13 is a view of the Reduce/Enlarge window shown in FIG. 12 following removal of the conflict message after re-programming of the print image to a size less than the maximum image size that can be processed;

FIG. 14 is a view of another programming example showing the Reduce/Enlarge programming selections depicted in FIG. 11 with conflict message following programming a print image size exceeding the maximum image size that can be processed; and FIG. 15 is a view following opening of the Crop window of the Job Ticket shown in FIG. 7 showing removal of the conflict depicted in FIG. 14 through cropping the document image to a size less than the maximum image size that can be processed.

Figure 2:
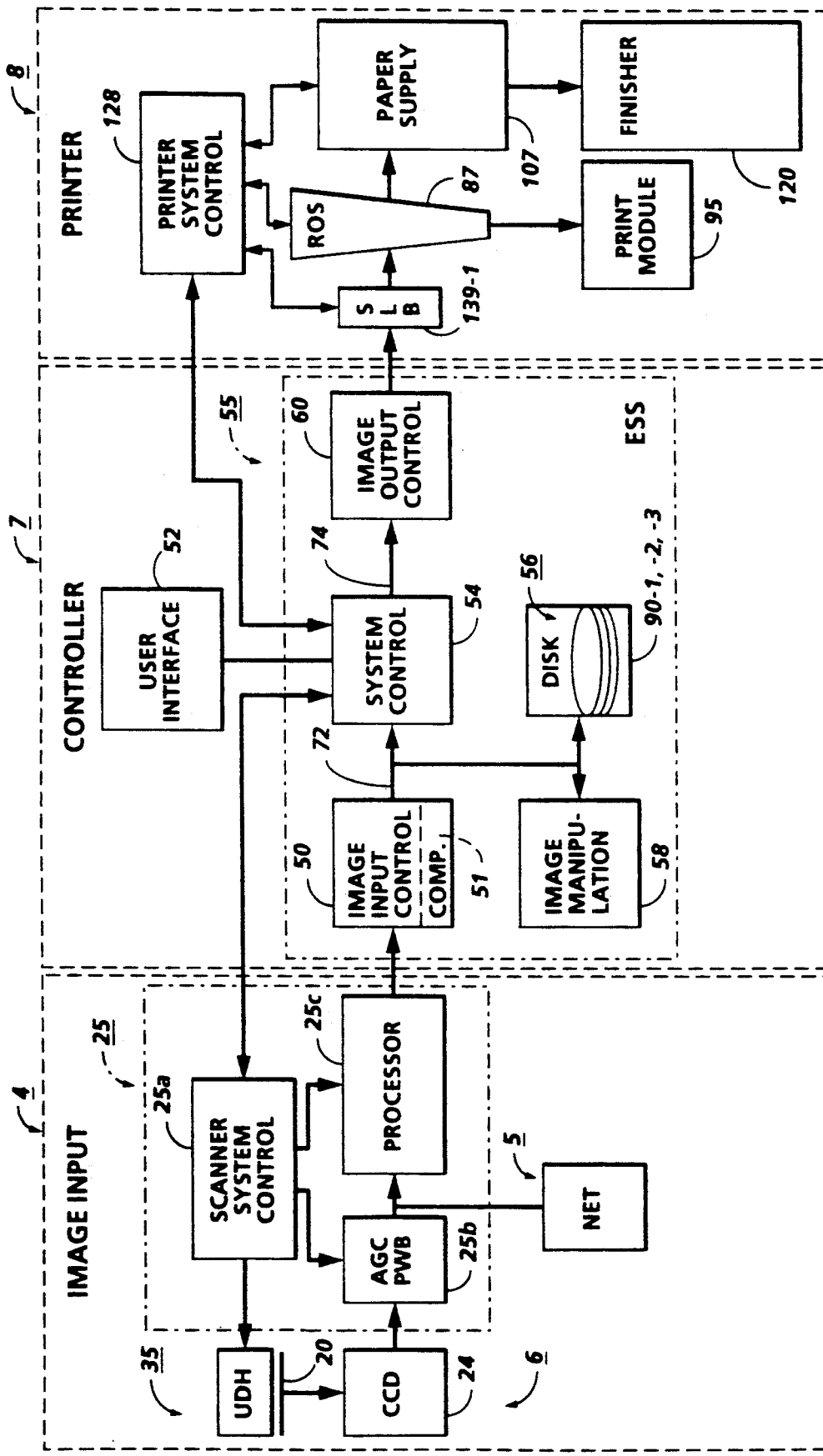
FIG. 2 is a block diagram depicting the major elements of the printing system shown in FIG. 1.

Referring to drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller and printer; etc. While a specific printing system is shown and described, the present invention may be used with other types of printing systems. For example, printer section 8 may instead use a different printer type such as ink jet, ionographic, thermal, photographic, etc., and furthermore may be incorporated in electronic display systems, such as CRTs, LCDs, LEDs, etc. or else other image scanning/processing/recording systems, or else other signal transmitting/receiving/recording systems, etc. as well.

Figure 3:
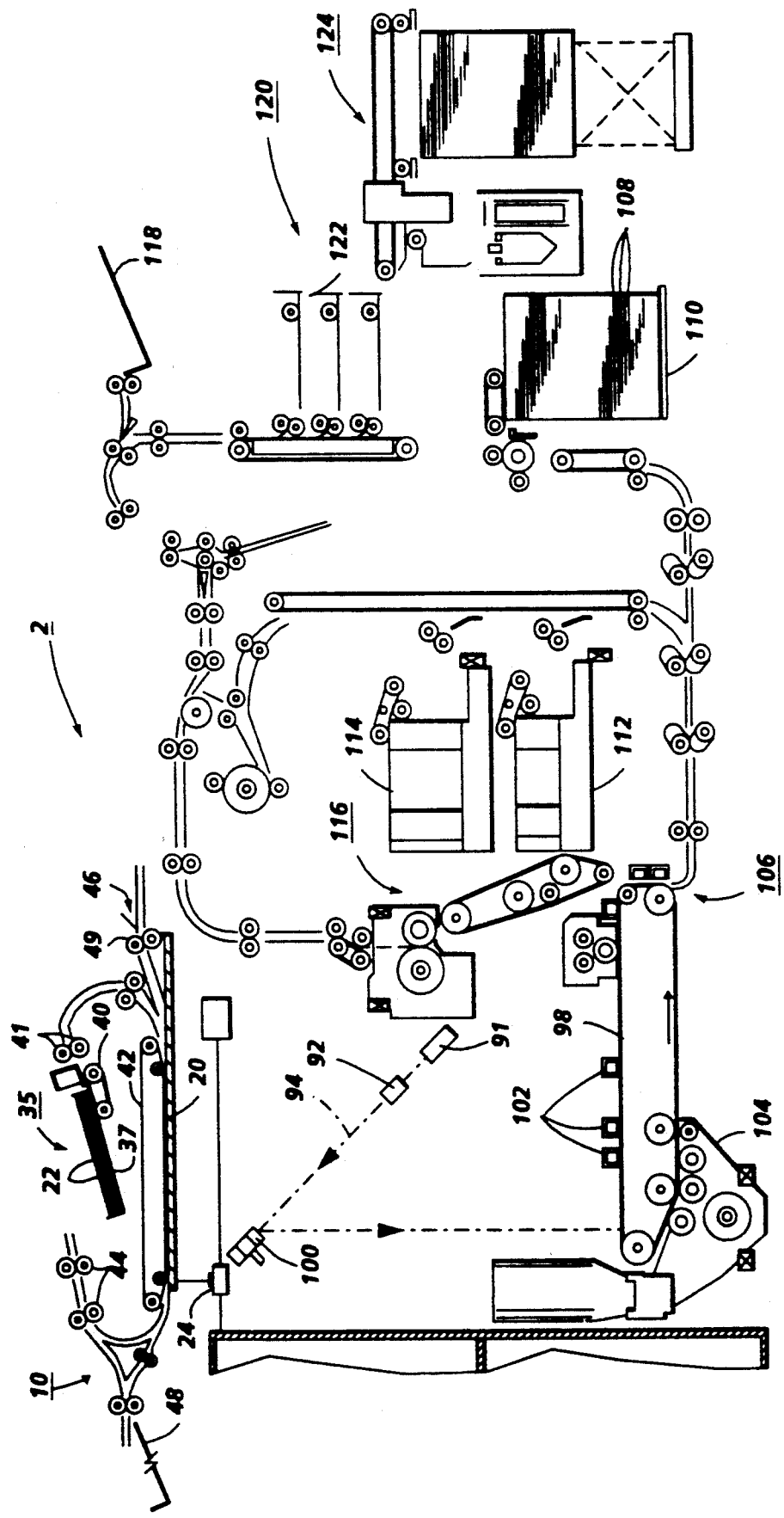
FIG. 3 is a plan view illustrating the principal mechanical components of the printing system shown in FIG. 1.
Figure 4:
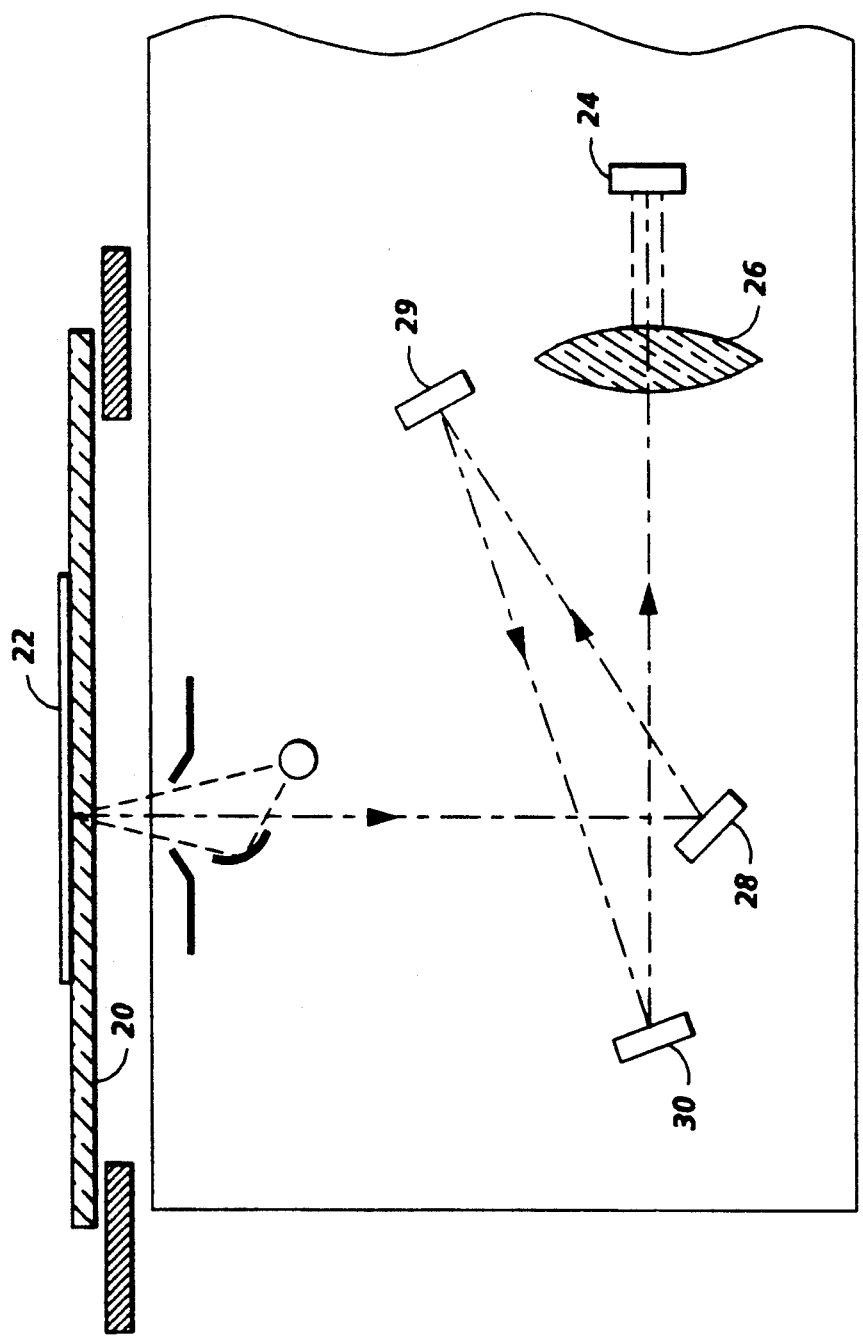
FIG. 4 is a schematic view showing certain construction details of the document scanner for the printing system shown in FIG. 1.

Referring particularly to FIGS. 2-4, for off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (note shown) are provided. Other remote sources of image data such as streaming tape, floppy disk, etc. may be envisioned.

For on-site image input, section 4 has a document scanner section 6 with a universal Document Handler (UDH) 35 for the purpose of automatically and sequentially placing and locating sets of multiple documents 22 for scanning on a transparent platen 20. One or more linear light sensitive arrays 24 are supported for reciprocating scanning movement below platen 20. Lens 27 and mirrors 28, 29, 30 cooperate to focus array 24 on a line like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the system controller 54 (described below) and includes a scanner system control 25a, an automatic gain control 25b, and a processor 25c. Gain control 25b converts the analog image signals output by array 24 to digital signals and processor 25c processes the digital image signals as required to enable controller section 7 to store and handle the image in the form and order required to carry out the job programmed. After processing, the image signals are output to controller section 7. Image pixels derived from net 5 are similarly input to processor 25.

Processor 25 also provides enhancements and changes to the image signals such as filtering, thresholding, screening, cropping, scaling (reduction/enlargement, etc.). Following any changes and adjustments in the job program which affect these image processing parameters, the document must be rescanned to capture the specified modification within scan processor 25.

Documents 22 to be scanned may be located on platen 20 for scanning by Universal document handler (UDF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, UDH 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, Finisher 120, and Printer System Control 128. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92.

Photoreceptor 98 is uniformly charged by corotrons 102 at a charging station preparatory to exposure by imaging beams 94. The latent electrostatic images are developed by developer 104 and transferred at transfer station 106 to a suitable print media such as Paper Stock 108 delivered by Paper Supply section 107. Paper Stock 108 may comprise any of a variety of sheet sizes, types, and colors. For transfer, the print Paper Stock is brought forward in timed registration with the developed image on photoreceptor 98 from either a main paper tray 110 or from auxiliary paper trays 112, or 114. The developed image transferred to the Paper Stock 108 is permanently fixed or fused by fuser 16 and the resulting prints discharged to either output tray 118, or to finisher 120. Finisher 120 includes a stitcher 122 for stitching or stapling the prints together to form books and a thermal binder 124 for adhesively binding the prints into books. Other finishing options such as slitting, perforating, saddle stitching, folding, trimming, or the like, either singly or in combination may also be accommodated in alternate finishing modules.

Referring to FIGS. 1, 2 and 5, controller section 7 is, for explanation purposes, divided into an image input controller 50, User Interface (UI) 52, system controller 54, main memory 56, image manipulation section 58, and image output controller 60. The units 50, 54, 56, 58, 60 comprise a system 55 which may also generally be referred to as the "Electronic Subsystem" (ESS).

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, visual document facsimile display, programming information and icons, diagnostic information and pictorial views, etc. Items displayed on touchscreen 62 such as files and icons are actuated 9, i.e., opened, closed, displayed, etc.) by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready (document editing), decomposition, rotation, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIGS. 2 and 6, within the printer section 8 there is an extensive printer system controller 128 to automatically and precisely control all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multi-processor architecture characterized by multiple microprocessor controller cores, serially interconnected, and also serially linked to more numerous input/output processing circuit PWBs. These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local serial buses 142 serve to couple the I/O PWBs 138 with each other and with their associated core PWB.

I/O PWBs 137 handle normal and common signal I/O functions while custom I/O controller PWBs 139 handle specialized, complex I/O functions. These include Analog-Digital/Digital-Analog (ADA) PWBs 137-1 containing A/D and D/A conversion circuitry; Digital Input/Output (DIO) PWBs 137-2 to capture digital (binary) input signals and drive various digital output devices; and special coprocessors 139-1 (Scan Line Buffer/ROS Diagnostic Remote (SLB/RDR)), 139-2 (Registration Servo Controller (REG.SERVO)) and 139-3 (Finisher/Binder I/O Processor (FBIOP)). Additionally, Pixel Clock PWB 160 generates a video data "PIXEL" clock for retrieving and presenting image data to ROS 87 in precise synchronism with the aerial scanning activity of the laser beams 94 impinging upon photoreceptor surface 98, while Expanded Polygon Motor Driver (EPMD) PWB 160 provides the precision velocity servo control and drivers for the drive motor (not shown) of polygon 100.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Specialized intelligent serial communications controllers 149 control serial message handling and distribution over the serial communications buses, controllers 149-1 over shared-line bus 140, and controllers 149-2 over local bus 142.

Referring to FIG. 7, jobs are programmed in a Job Program mode in which there is displayed on touchscreen 62 a Job Ticket 150 with Job Level and Page Level Scorecards 152-1, 152-2 respectively, scorecards 152-1, 152-2 displaying various job programming options available for selection with job Ticket 150. A default selection is provided with each programming selection, the default selection being automatically implemented where no other programming selection is made.

As described print jobs may be derived from multiple sources, i.e., jobs scanned in using scanner 6 for printing: jobs scanned in, stored, and then edited or added to for printing later; jobs remotely scanned in and submitted to the system as for example through net 5; jobs remotely developed and then submitted to the system for printing, etc.

Due to structural limitations such as the physical size of photoreceptor 98, the size of the paper path, etc., the maximum size print image 200 that can be processed is limited. In the example shown, the maximum size print image is limited to 17×14.33 inches. In the present invention, when print image 200 is larger in width and/or height that the maximum size, a conflict is identified by means of a message displayed on touchscreen 62 informing the operator that a conflict exists together with a suggested procedure for removing the conflict. To avoid confusing the operator in cases where the data displayed on screen 62 appears to contradict the conflict message, the present invention provides a system image size window in which the size of the print image is numerically displayed.

Referring to FIGS. 7-12, an example of a job program of the type which gives rise to a conflict is shown. In this example, the operator, using the Job Ticket 150 displayed on touchscreen 62 and either by touching Document Description window 208 or pointing cursor 67 at window 208 and triggering mouse 66, opens window 208 to start the programming. Window 208 displays the various document Type and Size selections shown in FIG. 8. As will be understood the display, in the form of icons 210, 212, represents the Type and/or Size of the document or documents to be scanned by document handler section 6. In the example, a document size of 8.5×14 inches is selected while the document Type is defaulted to "Standard".

Paper Stock window 215 may be opened next to display the various Size, Type, and Color paper stock selections 216, 217, 218 respectively available as shown in FIG. 9. In the example, a Paper Stock size of 17×11 inches is selected. Paper Type and Color selections are defaulted to "Standard" and "White" respectively.

Sides & Orientation window 220 is opened to display the sides and orientation programming selections shown in FIG. 10. Side selections include 1- or 2-sided Input Documents 221 and 1- or 2-sided Output Prints 222. Additionally, Input Document or Output Print image orientation may be changed by actuating Sides & Orientation icon 223 to display Image Orientation icons 224-1, 224-2 for Input Documents and Output Prints respectively. In the example, Input Document Image Orientation is unchanged, while Output Print Image Orientation is rotated 270° as displayed on screen 62.

Reduce/Enlarge window 230 is opened to display various present enlargement/reduction selections 231 as well as zoom buttons 232, 233 enabling any size enlargement or reduction to be chosen as shown in FIG. 11. A window 237 displays the enlargement/reduction selection made in the form of a percentage (%). In the example shown in FIG. 12, a print image enlargement of 103% has been chosen. In addition, a print window 240 is provided in which the print image 200 as currently programmed is displayed. Rows of numbers 242, 244 along the X and Y axes respectively of print window 240 shows the relative size and orientation of print image 200 to the Paper Stock size that has been programmed. In the example discussed, a Paper Stock size of 17×11 inches was selected as indicated by numbers 242, 244, respectively, in FIG. 12. Window 245 displays the size of the print image currently programmed numerically.

It is understood that the order or sequence in which the exemplary print job described above is programmed may be different than that described.

As shown by print window 240 in FIG. 12, it appears that the final print image 200 programmed fits within the confines of the Paper Stock size of 11×17 inches that has been programmed and consequently within the maximum size of 17×14.3 inches which the system is capable of processing. Notwithstanding, a conflict exists and a conflict message 247 is displayed informing the operator that the system image size cannot exceed 17×14.3 inches. Further, two suggested ways to remove the conflict, i.e., decrease the % or crop the document, are suggested by message 247.

The conflict arises because the print image 200 programmed is considered, when determining whether or not the size of the print image exceeds the maximum size allowable, to have the same orientation as the document at the time of scanning and not the 270° orientation programmed by the operator. Accordingly, a comparison of the maximum image size 17×14.3 inches with the programmed image size in the original orientation, i.e., 8.76×14.42 inches, shows that the height of the print image, i.e., 14.42 inches, is greater than the height of the maximum image allowed, i.e., 14.3 inches. Thus, although the print image, when depicted in the 270° orientation programmed, appears to fit within the boundaries of the maximum image allowed (i.e., 17×14.3 inches compared with 14.42×8.76 inches) as shown in window 240, a conflict is nevertheless declared since the size of the print image programmed exceeds the size of the maximum image allowed along one side. The actual size of the print image is shown in System Image Size window 245 for the operator.

If as depicted in FIG. 13, the operator reduces the enlargement programmed from 103% to 102%, the image size programmed becomes 8.67×14.28 inches. On comparison with the maximum image size of 17×14.3 inches, it can be seen that the height of the print image programmed, i.e., 14.28 inches, is now less than the maximum height of 14.3 inches allowed. Since the width of 8.67 inches is within the maximum of 17 inches, the conflict is removed and conflict message 247 with suggested remedies is deleted.

In another programming example shown in FIG. 14, the print image 200 is programmed for an enlargement of 129%. This results in a print image size of 10.97×18.06 inches. On comparison with the maximum image size allowed, i.e., 17×14.3 inches, it can be seen that the height of the print image at 18.06 inches is greater than the maximum height of 14.3 inches allowed. Accordingly, conflict message 247 and suggested corrections are displayed on screen 62.

Referring also to FIGS. 7 and 15, to remove the conflict, the operator decides to crop the document and for this selects Crop 250 on Page Level scorecard 152-2. This displays on touchscreen 62 a document window 252 having a document image 253 therein, the relative size of document image 252 corresponding to the size of the documents being scanned. Number scales 254, 255 along the X and Y axes depict the relative size relation of document image 253 to document window 252. Top & Bottom and Left & Right crop icons 258, 260, 262, 264 are also displayed with corresponding windows 259, 261, 263, 265 showing the current size of document image 253 numerically. Image Size window 266 displays the current size of document image 253, in this example, 8.5×11 inches. By selectively actuating crop icons 258, 260, 262, 264, either by touch or by using mouse 66 to point cursor 67, the top, bottom, left, and/or right sides of the document as depicted by document image 253, can be cropped.

Print window 240 and system image size window 245 are also displayed on the right side of screen 62.

In the example shown, the operator, using top crop icon 258, has cropped 3" off of the top of the document (i.e., from 4 to 11 inches) as depicted in both document display window 252 and print image display window 240. As a result, the size of the print image programmed is changed to 10.97×14.19 inches which is less than the maximum image size, i.e., 17×14.3 inches, permitted. As a result, the conflict is removed.

Conflict determination may be represented by the following relationships:

(1) System Image Width=(Input Document Width-(Left Crop+Right Crop))×(Reduction/Enlargement %/100).

(2) System Image Height=(Input Document Height-(Top Crop+Bottom Crop))×(Reduction/Enlargement %/100).

The system image size displayed in window 245 also serves other purposes as, for example, to show how large an image will be when the image is printed since the size display takes into account for the operator the crop and reduction/enlargement values programmed. For example, if an operator desired to print on odd size stock, the operator could watch the image size values displayed in window 245 to determine the exact crop and/or reduction enlargement.

While the invention has been described with reference to the structure disclosed, it is not confined to the details set forth, but is intended to cover such modifications or changes as may come within the scope of the following claims.

I claim:

1. A process for identifying programming conflicts when programming a print job on an image processing system having a document scanner for scanning image bearing documents and converting the document images to image signals, processing means for processing said image signals in accordance with programming instructions to provide print images for making prints, a printer for making prints on print media from said print images, said print media being characterized by a size, and a display screen for displaying job programming selections and instructions, comprising the steps of:
   a) identifying a first orientation of a document to be scanned for said print job, said document including a print image in a first orientation;
   b) programming the size of the print media upon which the print image in the first orientation is to be printed;
   c) displaying a scale representative showing the size of the print media programmed on said screen;
   d) displaying a scale representative of said print image being programmed superimposed on said print media representation;
   e) programming instructions for changing the orientation of said print image from the first orientation to a second orientation;
   f) displaying said print image in the second orientation on said print media representation to show said change in print image orientation, said displayed print image having electronically represented dimensions and said scale representative showing the size of the print media and showing a size of said print image in the second orientation;
   g) following step e, comparing the size of said print image in the first orientation with a maximum size print image that can be processed by said system; and
   h) where said comparison indicates that the size of said print image in the first orientation is greater than said maximum size that can be processed by said system, displaying a conflict message on said screen even though said print image is displayed as fitting within said print media; and
   i) curing a conflict indicated by said conflict message by adjusting said electronically represented dimensions of said displayed print image in the second orientation so that said displayed print image is positioned within said displayed scale representative showing the size of the programmed print media.

2. The process according to claim 1 including the step of:
   displaying instructions for curing said conflict on said screen.

3. The process according to claim 1 including the steps of:
   a) providing an image size window;
   b) displaying the current width and height dimensions of the print image numerically in said window.

4. A process for identifying hidden programming conflicts when programming a print job on an image processing system capable of processing print images up to a preset maximum size, said processing system including a document scanner for scanning documents and converting the document images to image signals, processing means for processing said image signals in accordance with programming instructions to provide print images for making prints, and a printer for making prints on print sheets from said print images, and a display screen for displaying job programming selections and instructions, comprising the steps of:
a) programming the size of the documents to be scanned for said print job;
b) programming the print sheet size on which said print images are to be printed by said printer;
c) programming an instruction to rotate the print image for printing on said print sheets;
d) before completing programming of said print job, comparing the size of the print image programmed prior to rotation with said preset maximum size print image that can be processed; and
e) where said comparison indicates that the size of said print image programmed before rotation is greater than said preset maximum size print image that can be processed, displaying a conflict message on said screen;
in response to said conflict message, performing a selected one of the following steps:
reducing the size of said print image to avoid said conflict, and
cropping said print image to reduce the size of said print image and avoid said conflict.

5. The process according to claim 4 including the step of:
displaying instructions for curing said conflict on said screen.

6. The process according to claim 1, wherein said curing step includes variably adjusting said electronically represented dimensions of said displayed print image in the second orientation.

* * * * *